UNITED STATES PATENT OFFICE.

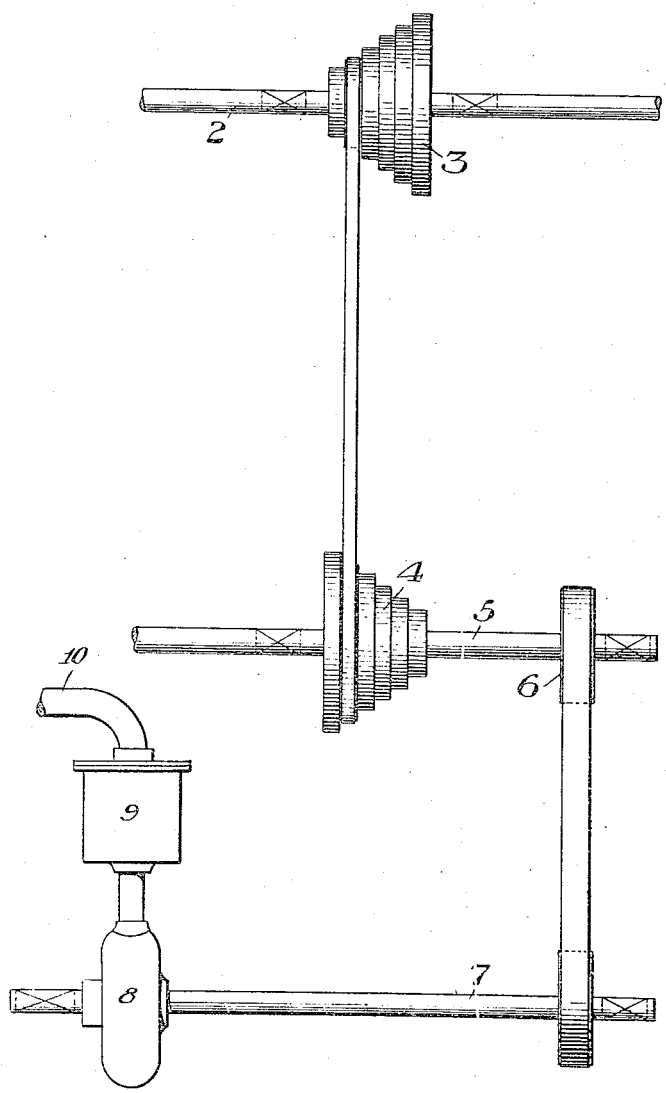

JAMES TODD, OF SEWICKLEY, PENNSYLVANIA.

METHOD OF PRODUCING SO-CALLED OZONIZED AIR.

1,066,065.  Specification of Letters Patent.  Patented July 1, 1913.

Application filed December 14, 1910. Serial No. 597,224.

*To all whom it may concern:*

Be it known that I, JAMES TODD, of Sewickley, in the county of Allegheny and State of Pennsylvania, have invented a new and useful Improvement in Methods of Producing So-Called Ozonized Air, of which the following is a full, clear, and exact description, reference being had to the accompanying drawings, forming part of this specification, in which the figure is a side elevation of one form of apparatus for carrying out my invention.

Heretofore in the operation of ozone machines, there has been no attempt to vary the amount of air passing to the ozonizing machine to compensate for the changes brought about by the changes of the temperature of the surrounding atmosphere, from which the air is drawn to pass through the machines. I have discovered that with the same ozone machine, a certain strength of gas will be given at a relatively low atmospheric temperature, while with the same amount of air at a relatively higher atmospheric temperature, the ozone constituent of the tread air will almost disappear. In other words, I have found that the strength of the so-called ozonized air varies with the temperature of the atmosphere from which it is drawn. For example, a given quantity of air drawn into the ozonizer at 15° C., will give a certain strength of the so-called ozonized air, while at a temperature of 18° to 20° C., for the external air, this gas or ozonized air is much weaker, and at a temperature of 28° or 30° C. in the external atmosphere, the so-called ozone constituent has almost disappeared. I have also discovered that I can greatly reduce or overcome this great variation in the "ozone" percentage by decreasing the quantity of air passed through the ozonizer as the temperature of the atmosphere rises, and increasing the quantity of air as the temperature of the atmosphere falls.

Of course, many different kinds of apparatus may be used for obtaining the desired result. For example, as shown in my drawings, the engine or actuating shaft 2 may be provided with a stepped cone pulley 3, having a belt leading to a similar reversed or stepped cone pulley 4, on the shaft 5, which is provided with a pulley 6, having a belt leading to a similar pulley on the shaft 7 of the blower 8, for supplying air to the ozonizer 9 having a pipe 10 leading therefrom. With this arrangement, as the temperature rises, the operator will shift the belt to successively smaller pulleys on the engine shaft, so as to decrease the speed of the blower and thereby decrease the amount of air passing to the so-called ozone machine.

Of course, many other forms of change gear devices may be used, and instead of using a change gear device, I may simply provide a valve for the air supply to the ozonizer, which valve will be gradually closed as the temperature rises, thus similarly decreasing the amount of air coming to the ozone machine. Of course, a thermostatic device may be provided, which will automatically decrease the amount of air as the temperature rises, and increase it as the temperature falls, but in my experiments on the subject, I have simply used a hand-operated device which will provide for this variation in the air supply according the temperature. The air may be drawn through the machine instead of forced through it.

The advantages of my invention will be obvious to those skilled in the art, since it provides a method for obtaining an ozonized air of a much more uniform character than was before possible. Heretofore, the strength or character of the gas has varied very greatly as the temperature of the surrounding atmosphere varied, while the reason for these changes in its strength has not been understood. My discovery provides for obtaining a comparatively regular or uniform character of this so-called ozonized air, thereby enabling uniform results to be obtained from its use.

I claim:

1. In the manufacture of so-called ozonized air, the step consisting of varying the amount of air passing to the ozonizer according to the temperature of the surrounding atmosphere, substantially as described.

2. In the manufacture of so-called ozonized air, the step consisting in reducing the amount of air passing to the ozonizer as the temperature rises, substantially as described.

3. In the manufacture of so-called ozonized air, the step consisting in increasing the amount of air passing to the ozone machine as the temperature falls, substantially as described.

4. In the manufacture of so-called ozonized air, the method consisting in varying the amount of air passing to the ozonizer in approximate proportion to the temperature of the surrounding atmosphere, decreasing the amount as the temperature rises and increasing it as the temperature falls, substantially as described.

5. In the manufacture of so-called ozonized air, the step consisting of varying the amount of air passing to the ozonizer, and reducing the amount of air as the temperature rises, but increasing the amount of air as the temperature falls, substantially as described.

In testimony whereof, I have hereunto set my hand.

JAMES TODD

Witnesses:
C. P. BYRNES,
H. M. CORWIN.

Copies of this patent may be obtained for five cents each, by addressing the "Commissioner of Patents, Washington, D. C."